US011304121B2

(12) United States Patent
Yin et al.

(10) Patent No.: US 11,304,121 B2
(45) Date of Patent: *Apr. 12, 2022

(54) LOCAL NETWORK CONNECTION METHOD, APPARATUS, AND SYSTEM

(71) Applicant: Huawei Technologies Co., Ltd., Shenzhen (CN)

(72) Inventors: Yu Yin, Shanghai (CN); Caixia Qi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

This patent is subject to a terminal disclaimer.

(21) Appl. No.: 16/922,698

(22) Filed: Jul. 7, 2020

(65) Prior Publication Data

US 2020/0336972 A1  Oct. 22, 2020

Related U.S. Application Data

(63) Continuation of application No. 16/201,429, filed on Nov. 27, 2018, now Pat. No. 10,764,816, which is a continuation of application No. PCT/CN2017/093900, filed on Jul. 21, 2017.

(30) Foreign Application Priority Data

Oct. 31, 2016 (CN) .......................... 201610978137.3

(51) Int. Cl.
*H04W 48/14* (2009.01)
*H04W 48/16* (2009.01)
(Continued)

(52) U.S. Cl.
CPC ........... *H04W 48/14* (2013.01); *H04W 8/082* (2013.01); *H04W 8/22* (2013.01); *H04W 48/16* (2013.01);
(Continued)

(58) Field of Classification Search
CPC ....... H04W 48/14; H04W 8/082; H04W 8/22; H04W 48/16; H04W 60/04; H04W 76/11;
(Continued)

(56) References Cited

U.S. PATENT DOCUMENTS

2009/0088179 A1\* 4/2009 Stuempert ............. H04W 8/245
455/456.1
2011/0026463 A1  2/2011 Lair
(Continued)

FOREIGN PATENT DOCUMENTS

CN  101860976 A  10/2010
CN  101868036 A  10/2010
(Continued)

*Primary Examiner* — Hashim S Bhatti
(74) *Attorney, Agent, or Firm* — Conley Rose, P.C.

(57) ABSTRACT

A local network connection method, apparatus, and system, where the method is applied to a control plane node, and includes: receiving a location area identity sent by an access node, where the location area identity is sent by the access node when receiving an access request sent by a user equipment, and is used to indicate a location area in which the user equipment is currently located; determining at least one local network identity based on the location area identity, and sending the at least one local network identity to the user equipment; receiving a connection establishment request sent by the user equipment, where the connection establishment request carries a first local network identity selected by the user equipment based on the at least one local network identity; and establishing a connection between the user equipment and a first local network based on the first local network identity.

20 Claims, 11 Drawing Sheets

(51) Int. Cl.
- *H04W 8/22* (2009.01)
- *H04W 76/30* (2018.01)
- *H04W 76/11* (2018.01)
- *H04W 60/04* (2009.01)
- *H04W 8/08* (2009.01)
- *H04W 40/20* (2009.01)
- *H04W 84/04* (2009.01)
- *H04W 4/021* (2018.01)

(52) U.S. Cl.
CPC ............ *H04W 60/04* (2013.01); *H04W 76/11* (2018.02); *H04W 76/30* (2018.02); *H04W 4/021* (2013.01); *H04W 40/20* (2013.01); *H04W 84/045* (2013.01)

(58) Field of Classification Search
CPC ..... H04W 76/30; H04W 4/021; H04W 40/20; H04W 84/045; H04W 48/04; H04W 48/20; H04W 76/10; H04W 48/18
See application file for complete search history.

(56) References Cited

U.S. PATENT DOCUMENTS

| | | |
|---|---|---|
| 2011/0045834 A1 | 2/2011 | Kim et al. |
| 2011/0223887 A1 | 9/2011 | Rune et al. |
| 2012/0100856 A1 | 4/2012 | Ishida et al. |
| 2012/0257598 A1 | 10/2012 | Karampatsis et al. |
| 2012/0258766 A1* | 10/2012 | Cho ........................ H04W 36/14 455/525 |
| 2013/0279456 A1 | 10/2013 | Wang |
| 2015/0208281 A1 | 7/2015 | Kim et al. |
| 2016/0088487 A1* | 3/2016 | Yu ......................... H04W 16/14 370/329 |
| 2016/0286451 A1* | 9/2016 | Ahmad ................ H04W 76/10 |
| 2016/0309374 A1* | 10/2016 | Shu ...................... H04W 36/14 |
| 2016/0309439 A1* | 10/2016 | Wu ...................... H04W 60/005 |
| 2016/0344739 A1* | 11/2016 | Xu .......................... H04L 63/08 |
| 2017/0105150 A1* | 4/2017 | Olsson ................. H04W 36/14 |
| 2018/0014239 A1* | 1/2018 | Chau .................... H04W 36/34 |
| 2018/0035322 A1* | 2/2018 | Yamine ................ H04W 24/08 |

FOREIGN PATENT DOCUMENTS

| | | |
|---|---|---|
| CN | 102111903 A | 6/2011 |
| CN | 102238704 A | 11/2011 |
| CN | 102868997 | 1/2013 |
| JP | 2011515879 | 5/2011 |
| JP | 2013141106 A | 7/2013 |
| JP | 2014509820 A | 4/2014 |
| KR | 20140022400 A | 2/2014 |
| WO | 2010059122 A3 | 8/2010 |
| WO | 2011004599 A1 | 1/2011 |
| WO | 2012050841 A1 | 4/2012 |
| WO | 2012135467 A1 | 10/2012 |
| WO | 2016000172 A1 | 1/2016 |

\* cited by examiner

LOCAL NETWORK CONNECTION METHOD, APPARATUS, AND SYSTEM

CROSS-REFERENCE TO RELATED APPLICATIONS

This application is continuation of U.S. patent application Ser. No. 16/201,429, filed on Nov. 27, 2018, which is a continuation of International Patent Application No. PCT/CN2017/093900, filed on Jul. 21, 2017, which claims priority to Chinese Patent Application No. 201610978137.3, filed on Oct. 31, 2016. All the aforementioned patent applications are hereby incorporated by reference in their entireties.

TECHNICAL FIELD

Embodiments of the present application relate to the field of communications technologies, and in particular, to a local network connection method, apparatus, and system.

BACKGROUND

A local network is a network that can cover a specific area, for example, a network covering a place such as an enterprise campus, a coffee shop, a hotel, a school, or an airport. After connecting to a local network in an area, user equipment can access the local network to perform a network service. In addition, with development of a local network, the user equipment may alternatively connect to the local network using a mobile communications network provided by a mobile communications operator instead of conventionally connecting to the local network using Wireless Fidelity (WiFi), to reduce deployment and maintenance costs of the Wireless Fidelity.

FIG. 1A is a diagram of a logical architecture of a mobile communications network. As shown in FIG. 1A, the logical architecture includes a user equipment 11, an access node 12, a control plane node 13, and a user plane node 14. The user equipment 11 may access the mobile communications network using the local access node 12. The control plane node 13 is responsible for connection management, security authentication, mobility management, and location management of the user equipment 11. The user plane node 14 is responsible for forwarding service data of the user equipment 11. In a currently provided local network connection method, the mobile communications network operator plans a specific location area identity for an area covered by each local network. The control plane node 13 is a dedicated control plane node deployed by the mobile operator for a location area covered by a corresponding local network, and is configured to establish a connection to the corresponding local network. When entering the specific location area, the user equipment 11 may send an access request to the access node 12 in the location area. When receiving the access request, the access node 12 forwards the access request to the dedicated control plane node 13 in the location area. After receiving the access request, the dedicated control plane node 13 automatically establishes a connection between the user equipment 11 and the local network in the location area.

Other approaches have at least the following problems.

In the foregoing method, when user equipment enters a location area, a dedicated control plane node automatically establishes a connection between the user equipment and a local network, to be specific, the control plane node establishes a connection by default. However, in actual application, the local network that is connected by default may not be a local network that a user wants to access or a local network with relatively high quality. Therefore, the foregoing method has relatively low flexibility, and has specific limitations. In addition, in the foregoing method, a specific location area identity needs to be planned for each local network, and a dedicated control plane node needs to be deployed. Consequently, deployment costs are excessively high.

SUMMARY

To resolve a problem in other approaches, embodiments of the present application provide a local network connection method, apparatus, and system. The technical solutions are as follows.

According to a first aspect, a local network connection method is provided, and is applied to a control plane node. The method includes: receiving a location area identity sent by an access node, where the location area identity is sent by the access node when receiving an access request sent by a user equipment, and is used to indicate a location area in which the user equipment is currently located; determining at least one local network identity based on the location area identity, and sending the at least one local network identity to the user equipment; receiving a connection establishment request sent by the user equipment, where the connection establishment request carries a first local network identity selected by the user equipment based on the at least one local network identity; and establishing a connection between the user equipment and a first local network based on the first local network identity.

In this embodiment of the present application, when the user equipment sends the access request to the access node in the location area in which the user equipment is currently located, the access node may send, to the control plane node based on the access request, the location area identity indicating the location area in which the user equipment is currently located. The control plane node may determine the at least one local network identity based on the location area identity, and send the at least one local network identity to the user equipment for selection by the user equipment. Subsequently, when the connection establishment request sent by the user equipment is received, and the connection establishment request carries the first local network identity selected by the user equipment based on the at least one local network identity, the connection between the user equipment and the first local network can be established.

When the user equipment enters a location area, the control plane node may send at least one local network identity in the location area to the user equipment. Therefore, a user may autonomously select, using the user equipment, a local network that needs to be accessed, to be more specific, autonomously select a local network that the user wants to access or a local network with relatively high quality, such that a local network connection effect and flexibility are improved, and a local network connection mode is extended. In addition, a mobile communications network operator does not need to plan a specific location area identity for each local network or deploy a dedicated control plane node, a plurality of local networks may be planned to be in a same location area, and the control plane node may simultaneously serve a plurality of adjacent location areas, such that deployment costs are reduced.

In another embodiment, determining at least one local network identity based on the location area identity includes: obtaining, from a stored location area list, a local network identity corresponding to the location area identity, where the location area list stores a plurality of location area identities and corresponding local network identities; and determining the local network identity corresponding to the location area identity as the at least one local network identity.

In this embodiment of the present application, the plurality of location area identities and the corresponding local network identities are stored in the location area list in advance, and in a subsequent process, the location area list is directly searched for the local network identity corresponding to the current location area identity of the user equipment. As such, accuracy and efficiency of determining the local network are improved.

In another embodiment, determining at least one local network identity based on the location area identity includes: obtaining, from a stored location area list, a local network identity corresponding to the location area identity; receiving the access request sent by the user equipment using the access node, where the access request carries local network access indication information, and the local network access indication information is used to indicate whether the user equipment is allowed to access a local network; and when the local network access indication information indicates that the user equipment is allowed to access the local network, determining the local network identity corresponding to the location area identity as the at least one local network identity.

In this embodiment of the present application, the control plane node may further determine, based on both the local network access indication information of the user equipment and the location area list, at least one local network that allows the user equipment to access. The local network access indication information is used to indicate whether the user equipment is allowed to access the local network, to be more specific, whether the user allows the used user equipment to access the local network. Therefore, the user equipment may be connected to the local network with reference to willingness of the user, such that local network connection flexibility and a connection effect are further improved.

In another embodiment, determining at least one local network identity based on the location area identity includes: obtaining, from a stored location area list, a local network identity corresponding to the location area identity; obtaining local network subscription information of the user equipment, where the local network subscription information includes local network identity information, and the local network identity information is an identity of a local network that allows the user equipment to access; and determining the at least one local network identity based on the local network identity corresponding to the location area identity and the local network identity information.

In this embodiment of the present application, the control plane node may further obtain the local network subscription information of the user equipment, where the local network subscription information includes the local network identity information. The local network identity information is used to indicate the identity of the local network that allows the user equipment to access, to be more specific, a local network subscribed by the user equipment in advance. Therefore, at least one local network that allows the user equipment to access may be comprehensively determined based on the local network identity corresponding to the location area identity and the identity of the local network subscribed by the user equipment, such that a local network connection management manner is extended, and connection accuracy and a connection effect are further improved.

In another embodiment, determining at least one local network identity based on the location area identity includes: obtaining, from a stored location area list, a local network identity corresponding to the location area identity; obtaining local network subscription information of the user equipment, where the local network subscription information includes network capability indication information, and the network capability indication information is used to indicate whether the user equipment is allowed to access a local network; and when the network capability indication information indicates that the user equipment is allowed to access the local network, determining the local network identity corresponding to the location area identity as the at least one local network identity.

In this embodiment of the present application, the local network subscription information of the user equipment may further include the network capability indication information, where the network capability indication information is used to indicate whether the user equipment is allowed to access the local network, to be more specific, whether the user equipment enables, in advance through subscription, a function of accessing the local network. Therefore, the control plane node may further connect the user equipment to the local network with reference to the network capability indication information in the local network subscription information, such that a local network connection management manner is extended, and connection accuracy and a connection effect are further improved.

In another embodiment, determining at least one local network identity based on the location area identity includes: obtaining, from a stored location area identity list, a local network identity corresponding to the location area identity; obtaining an operator policy, where the operator policy includes local network identity information, and the local network identity information is an identity of a local network that allows the user equipment to access; and determining the at least one local network identity based on the local network identity corresponding to the location area identity and the local network identity information.

In another embodiment, determining at least one local network identity based on the location area identity includes: obtaining, from a stored location area identity list, a local network identity corresponding to the location area identity; obtaining an operator policy, where the operator policy includes network capability indication information, and the network capability indication information is used to indicate whether the user equipment is allowed to access a local network; and when the network capability indication information indicates that the user equipment is allowed to access the local network, determining the local network identity corresponding to the location area identity as the at least one local network identity.

In this embodiment of the present application, a local network accessed by the user equipment may be further set and managed using the operator policy of a mobile communications network operator to which the control plane node belongs. Additionally, the operator policy may further include the local network identity information or the network capability indication information. As such, a local network connection management manner is further extended, and connection accuracy and a connection effect are improved.

In another embodiment, the access request includes a location area update request or an attach request, where the location area update request is sent by the user equipment when the location area in which the user equipment is located changes, and the attach request is sent by the user equipment when the equipment is enabled.

In this embodiment of the present application, when receiving the location area update request sent by the user equipment, the access node may send a location area identity to the control plane node, such that the user equipment accesses a local network in a location area in which the user equipment is located after moving. Alternatively, when receiving the attach request of the user equipment, the access node may send a location area identity to the control plane node, such that the user equipment accesses a local network of a location area in which the user equipment is located when the equipment is enabled. When the location area update request or the attach request of the user equipment is received, the location area identity is sent, such that the user equipment is enabled to access the local network using a mobile communications network.

In another embodiment, before establishing a connection between the user equipment and a first local network based on the first local network identity, the method further includes: determining whether the at least one local network identity includes the first local network identity; and when the at least one local network identity includes the first local network identity, establishing the connection between the user equipment and the first local network based on the first local network identity.

In this embodiment of the present application, after receiving the first local network identity sent by the user equipment, the control plane node may further check the first local network identity. To be more specific, the control plane node may determine whether the first local network identity is included in the at least one local network identity sent by the control plane node to the user equipment, and when the first local network identity is included in the at least one local network identity, the connection is established, such that accuracy is further improved.

In another embodiment, the local network identity is an access point name corresponding to a local network, a network name of the local network, or an enterprise name of the local network.

According to a second aspect, a local network connection apparatus is provided. The local network connection apparatus has a function of implementing the local network connection method in the first aspect. The local network connection apparatus includes at least one module, and the at least one module is configured to implement the local network connection method provided in the first aspect.

According to a third aspect, a local network connection apparatus is provided. A structure of the local network connection apparatus includes a processor and a memory. The memory is configured to: store a program supporting the local network connection apparatus in performing the local network connection method; and store related data used to implement the local network connection method. The data may be a location area list, local network subscription information, an operator policy, and the like. The processor is configured to execute the program stored in the memory. The local network connection apparatus may further include a communications bus, and the communications bus is configured to establish a connection between the processor and the memory.

According to a fourth aspect, an embodiment of the present application provides a computer storage medium configured to: store a computer software instruction used by the local network connection apparatus; or store a related program used to execute the local network connection apparatus in the second aspect and the third aspect.

According to a fifth aspect, an embodiment of the present application provides a local network connection system, and the system includes a user equipment, an access node, and a control plane node. The control plane node is configured to implement the local network connection method provided in the first aspect.

Technical effects obtained in the second aspect to the fourth aspect of the foregoing embodiments of the present application are similar to technical effects obtained using corresponding technical means in the first aspect, and details are not described herein.

The technical solutions provided in the embodiments of the present application bring the following beneficial effects.

In the embodiments of the present application, when the user equipment enters a location area and sends an access request to the access node, the access node may send, to the control plane node, a location area identity indicating the location area in which the user equipment is currently located. The control plane node may determine at least one local network identity based on the location area identity, and send the at least one local network identity to the user equipment for selection by the user equipment. Therefore, the user may autonomously select, using the user equipment, a local network that needs to be accessed. To be more specific, the user may autonomously select a local network that the user wants to access or a local network with relatively high quality, such that a local network connection effect and flexibility are improved, and a local network connection mode is extended. In addition, the mobile communications network operator does not need to plan a specific location area identity for each local network or deploy a dedicated control plane node, a plurality of local networks may be planned to be in a same location area, and the control plane node may simultaneously serve a plurality of adjacent location areas, such that deployment costs are reduced.

BRIEF DESCRIPTION OF DRAWINGS

To describe the technical solutions in the embodiments of the present application more clearly, the following briefly describes the accompanying drawings required for describing the embodiments. The accompanying drawings in the following description show only some embodiments of the present application, and a person of ordinary skill in the art may derive other drawings from these accompanying drawings without creative efforts.

DESCRIPTION OF EMBODIMENTS

To make the objectives, technical solutions, and advantages of the present application clearer, the following further describes implementations of the present application in detail with reference to the accompanying drawings.

An application scenario of embodiments of the present application is first described before the embodiments of the present application are described in detail. A local network access method provided in the embodiments of the present application is applied to a mobile communications network, to connect user equipment to a local network using the mobile communications network. For a logical architecture of the mobile communications network, refer to FIG. 1A.

Figure 1A:
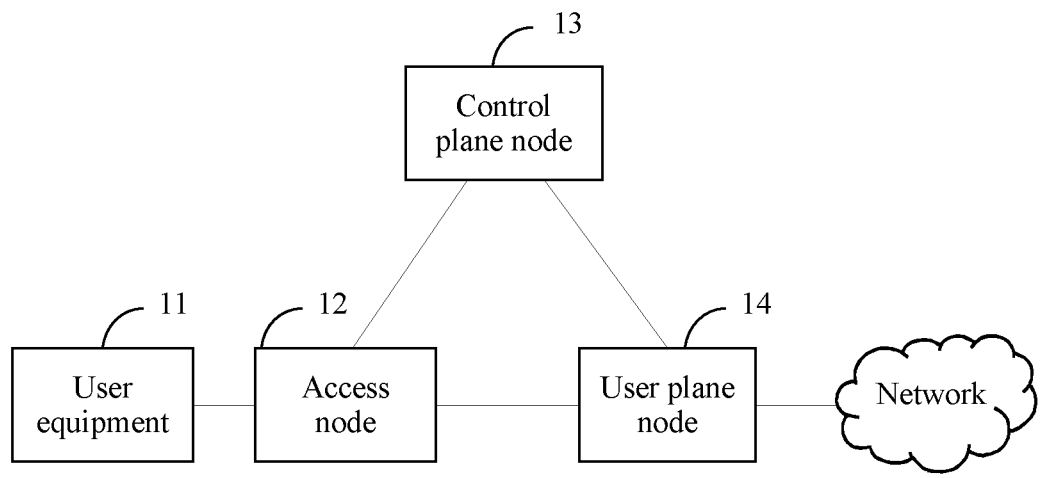
FIG. 1A is a diagram of a logical architecture of a mobile communications network according to an embodiment of the present application.
Figure 1B:
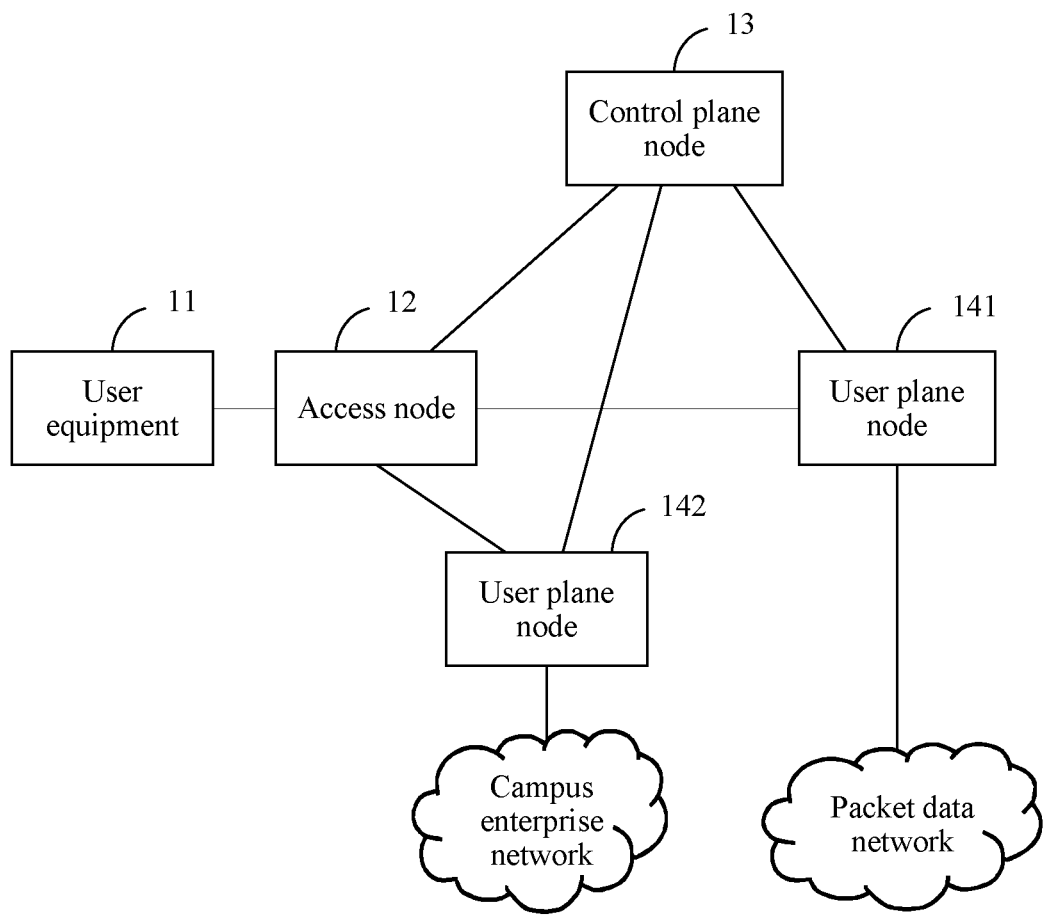
FIG. 1B is a diagram of a logical architecture of another mobile communications network according to an embodiment of the present application.

Referring to FIG. 1A, a user plane node 14 may include a user plane node of a public network and a user plane node of a local network. The user plane node of the public network is configured to provide access to an external packet data network, and the user plane node of the local network is configured to provide access to the local network. For example, for an enterprise campus, a user plane node of a local network may be deployed at the campus or at a location near the campus, to provide access to a campus enterprise network. Referring to FIG. 1B, outside a range of the campus, a user equipment may access an external packet data network using a user plane node 141 of a public network; and within the range of the campus, the user equipment may access the campus enterprise network of the campus using a user plane node 142 of the local network.

In application, the foregoing mobile communications network may be a next generation communications network, an Evolved Packet System (EPS) network, an evolved Long Term Evolution (eLTE) network, a 2nd Generation/3rd Generation (2G/3G) network, or the like.

In the following, the foregoing four mobile communications networks are further described in detail with reference to the accompanying drawings.

(1) Next Generation Communications Network

When the mobile communications network is the next generation communications network, for a diagram of the logical architecture shown in FIG. 1A, a control plane node 13 is a control plane function network element, and the user plane node 14 is a user plane function network element.

Figure 1C:
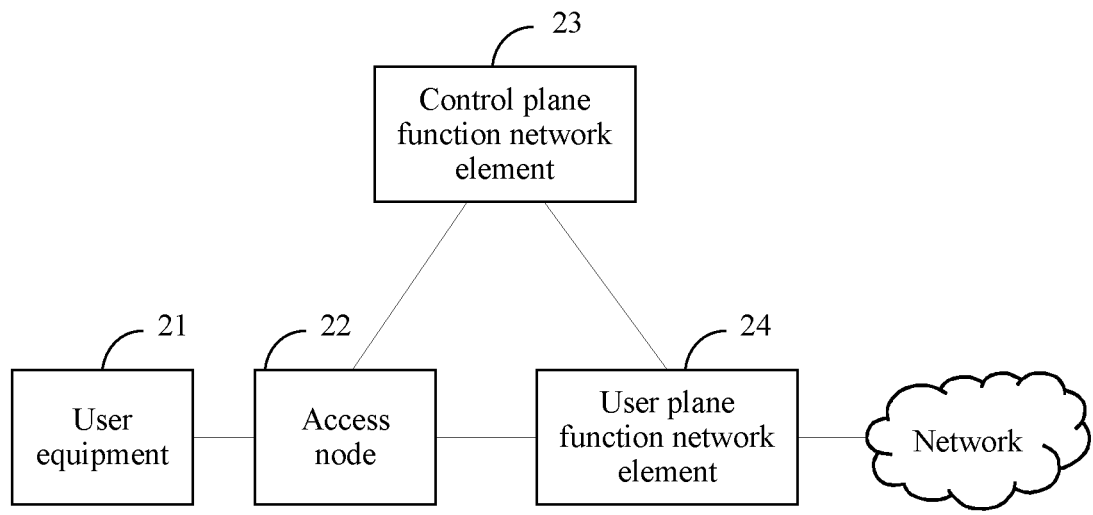
FIG. 1C is a diagram of a logical architecture of a next generation communications network according to an embodiment of the present application.

FIG. 1C is a diagram of a logical architecture of a next generation communications network according to an embodiment of the present application. As shown in FIG. 1C, the logical architecture of the next generation communications network includes a user equipment 21, an access node 22, a control plane function network element 23, and a user plane function network element 24.

The access node 22 may be a next generation (NextGen) air transportation system, the control plane function network element 23 may be a control plane (CP) or a core control function (CCF), and the user plane function network element 24 may be a user plane (UP).

The control plane function network element 23 may be further split into independent function network elements such as a session management (SM) function and a mobility management (MM) function. The session management function is responsible for functions such as session establishment, update, and deletion of the user equipment, and the mobility management function is responsible for mobility management of the user equipment.

(2) EPS Network

When the mobile communications network is the EPS network, for a diagram of the logical architecture shown in FIG. 1A, an access node 12 is an access network, a control plane node 13 is a mobility management entity (MME), and the user plane node 14 is a serving gateway (SGW) and a packet data network gateway (PGW).

Figure 1D:
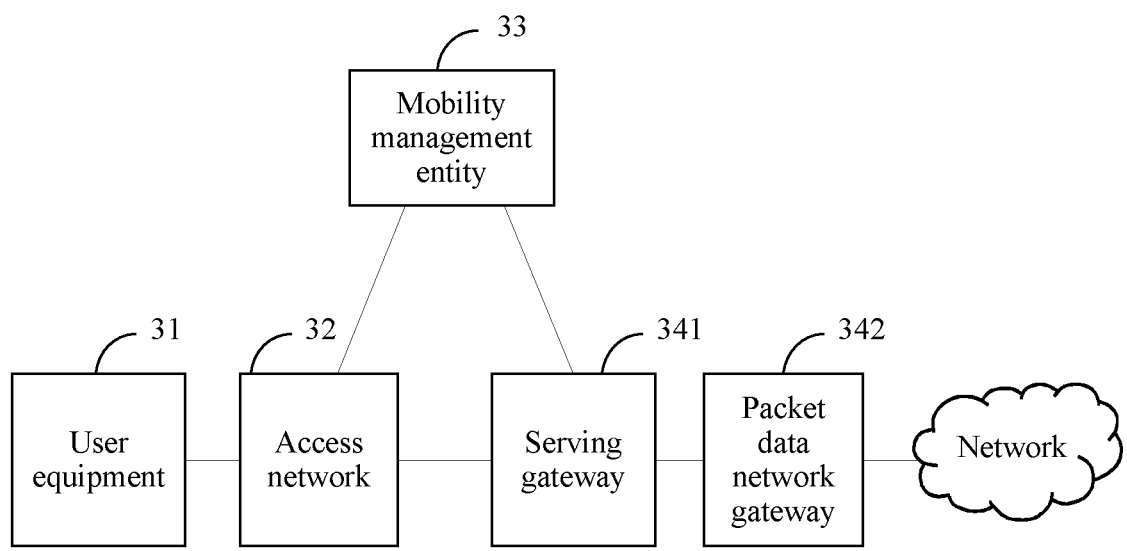
FIG. 1D is a diagram of a logical architecture of an EPS network according to an embodiment of the present application.

FIG. 1D is a diagram of a logical architecture of an EPS network according to an embodiment of the present application. As shown in FIG. 1D, the logical architecture of the EPS network includes a user equipment 31, an access network 32, a mobility management entity 33, a serving gateway 341, and a packet data network gateway 342.

The mobility management entity 33 is responsible for functions such as location management, connection management, security authentication, and gateway selection of the user equipment. The serving gateway 341 is a local access gateway of a user terminal, and is responsible for forwarding data related to an access technology. The packet data network gateway 342 is a gateway for the user terminal to access an external data network. In addition, in the EPS network, the serving gateway 341 and the packet data network gateway 342 further perform some control plane functions, such as connection management.

(3) eLTE Network

When the mobile communications network is the eLTE network, for a diagram of the logical architecture shown in FIG. 1A, an access node 12 is an access network, a control plane node 13 is a mobility management entity, and the user plane node 14 is a user plane serving gateway and a user plane packet data network gateway.

It should be noted that the eLTE network is an enhanced network of the EPS network. A difference between the eLTE network and the EPS network is that the eLTE network splits a serving gateway into a control plane serving gateway and a user plane serving gateway, and splits a packet data network gateway into a control plane packet data network gateway and a user plane packet data network gateway.

Figure 1E:
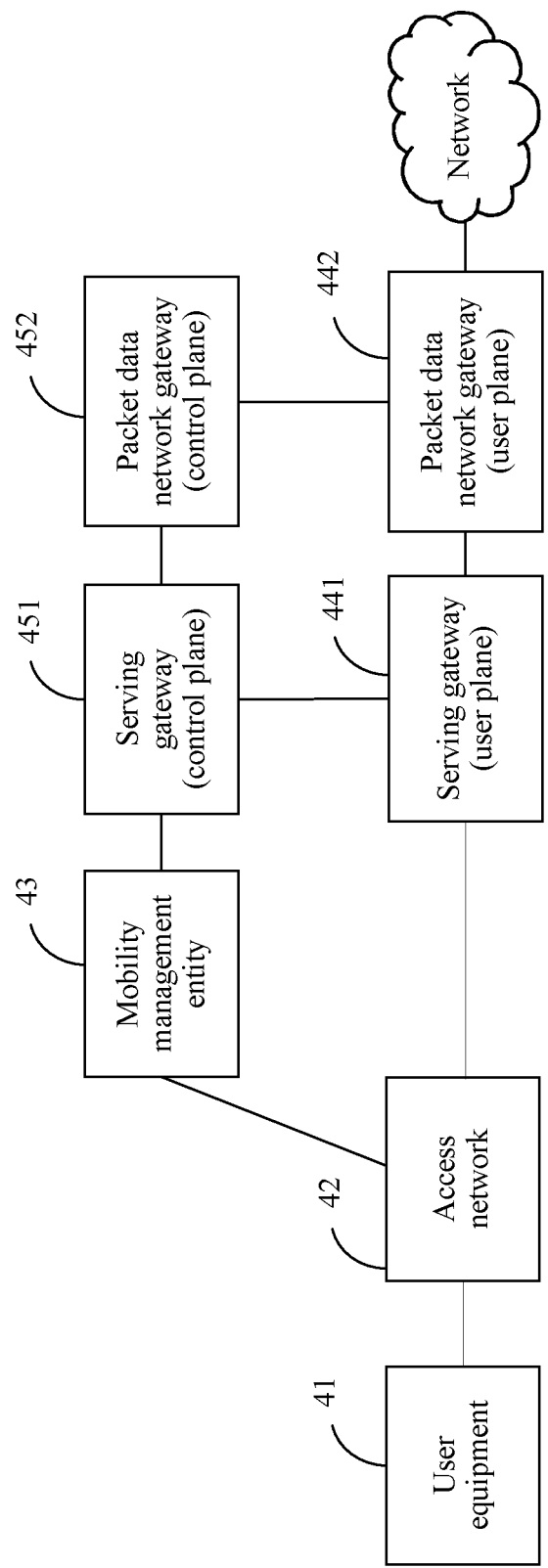
FIG. 1E is a diagram of a logical architecture of an eLTE network according to an embodiment of the present application.

FIG. 1E is a diagram of a logical architecture of an eLTE network according to an embodiment of the present application. As shown in FIG. 1E, the logical architecture of the eLTE network includes a user equipment 41, an access network 42, a mobility management entity 43, a user plane serving gateway 441, a user plane packet data network gateway 442, a control plane serving gateway 451, and a control plane packet data network gateway 452.

(4) 2G/3G Network

When the mobile communications network is the 2G/3G network, for a diagram of the logical architecture shown in FIG. 1A, an access node 12 may be an access network, a control plane node 13 may be a serving general packet radio service (GPRS) Support Node (SGSN), and the user plane node 14 may be a gateway GPRS support node (GGSN).

Figure 1F:
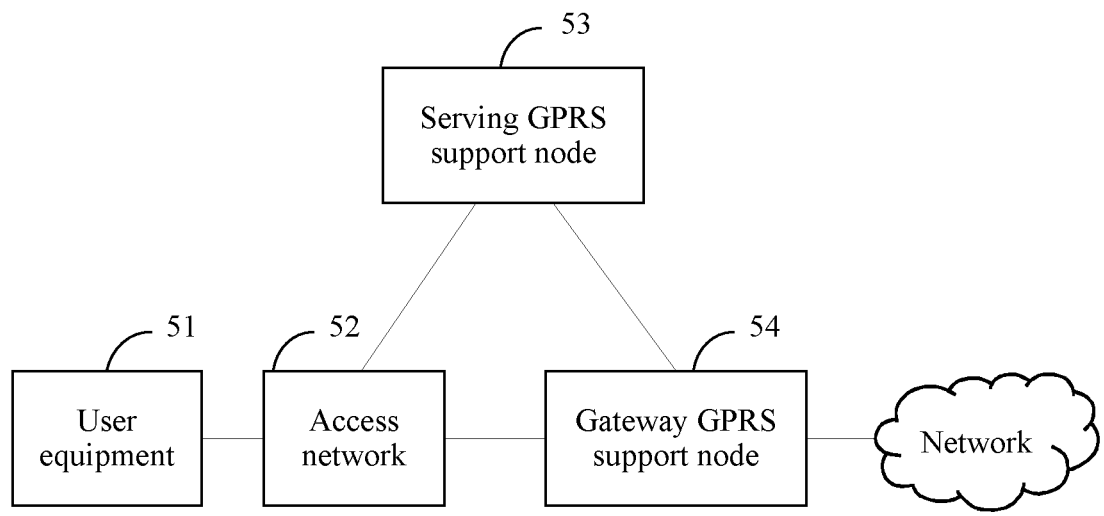
FIG. 1F is a diagram of a logical architecture of a 2G/3G network according to an embodiment of the present application.

FIG. 1F is a diagram of a logical architecture of a 2G/3G network according to an embodiment of the present application. As shown in FIG. 1F, the logical architecture of the 2G/3G network includes a user equipment 51, an access network 52, a serving GPRS support node 53, and a gateway GPRS support node 54.

The 2G/3G network may be a Global System for Mobile Communications (GSM) network, a GPRS network, a Universal Mobile Telecommunications System (UMTS) network, or the like.

The method provided in the present application is performed by the control plane node 13 in FIG. 1A. It may be learned from the foregoing description that the control plane node 13 may be a control plane function network element, a mobility management entity (MME), a serving GPRS support node (SGSN), or the like.

In addition, in the embodiments of the present application, a plurality of local networks may be planned to be in a same location area, and the control plane node 13 may simultaneously serve a plurality of adjacent location areas.

Figure 1G:
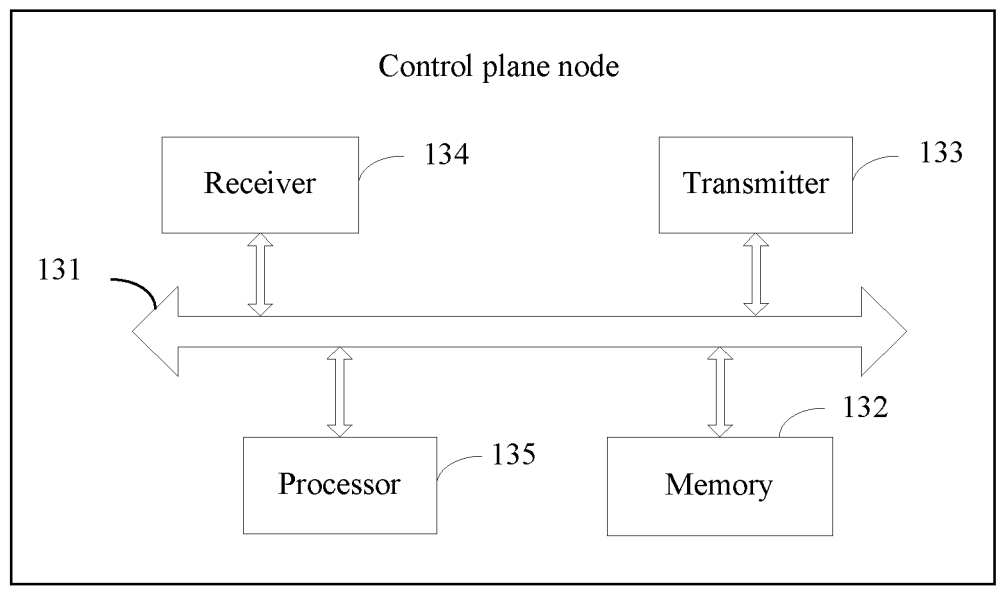
FIG. 1G is a schematic structural diagram of a control plane node according to an embodiment of the present application.

Referring to FIG. 1G the control plane node may include a communications bus 131, a memory 132, a transmitter 133, a receiver 134, and a processor 135. The memory 132, the transmitter 133, the receiver 134, and the processor 135 may be interconnected using the communications bus 131.

The transmitter 133 and the receiver 134 are configured to communicate with another network device. For example, the control plane node may communicate with the access node using the receiver 134, to receive a location area identity sent by the access node. Alternatively, the control plane node may communicate with the user equipment using the transmitter 133 and the receiver 134, to send a local network identity to the user equipment using the transmitter 133, and receive, using the receiver 134, a local network identity sent by the user equipment.

The memory 132 is configured to store a program, and the processor 135 is configured to invoke a program stored in the memory 132 to implement the following method: receiving a location area identity sent by the access node, where the location area identity is sent by the access node when receiving an access request sent by the user equipment, and is used to indicate a location area in which the user equipment is currently located; determining at least one local network identity based on the location area identity, and sending the at least one local network identity to the user equipment; receiving a connection establishment request sent by the user equipment, where the connection establishment request carries a first local network identity selected by the user equipment based on the at least one local network identity; and establishing a connection between the user equipment and a first local network based on the first local network identity.

It should be noted that the processor 135 may be an integrated circuit chip, and has a signal processing capability. In an implementation process, the foregoing steps may be completed using an integrated logic circuit of hardware in the processor or an instruction in a form of software. The instruction may be implemented and controlled by cooperating with the processor. The processor may be a general purpose processor, a digital signal processor (DSP), an application-specific integrated circuit (ASIC), a field programmable gate array (FPGA) or another programmable logic device, a discrete gate or a transistor logic device, or a discrete hardware assembly.

The general purpose processor may be a microprocessor, or may be any conventional processor, decoder, or the like. The steps of the method disclosed with reference to the embodiments of the present application may be directly implemented using a hardware processor, or may be implemented using a combination of a hardware module and a software module in the processor. The software module may be located in a mature storage medium in the field, such as a random access memory, a flash memory, a read-only memory, a programmable read-only memory, an electrically-erasable programmable memory, or a register.

In addition, the transmitter 133 and the receiver 134 may be two pieces of separate hardware, or may be integrated into the control plane node as a whole. For example, the transmitter 133 and the receiver 134 may be integrated into one transceiver.

In addition, the control plane node may further include a communications interface, configured to support communication between the control plane node and another network device. In addition to a data bus, the communications bus 131 further includes a power bus, a control bus, and a status signal bus. However, for clarity of description, various buses are marked as the communications bus 131 in FIG. 1G.

Figure 2:
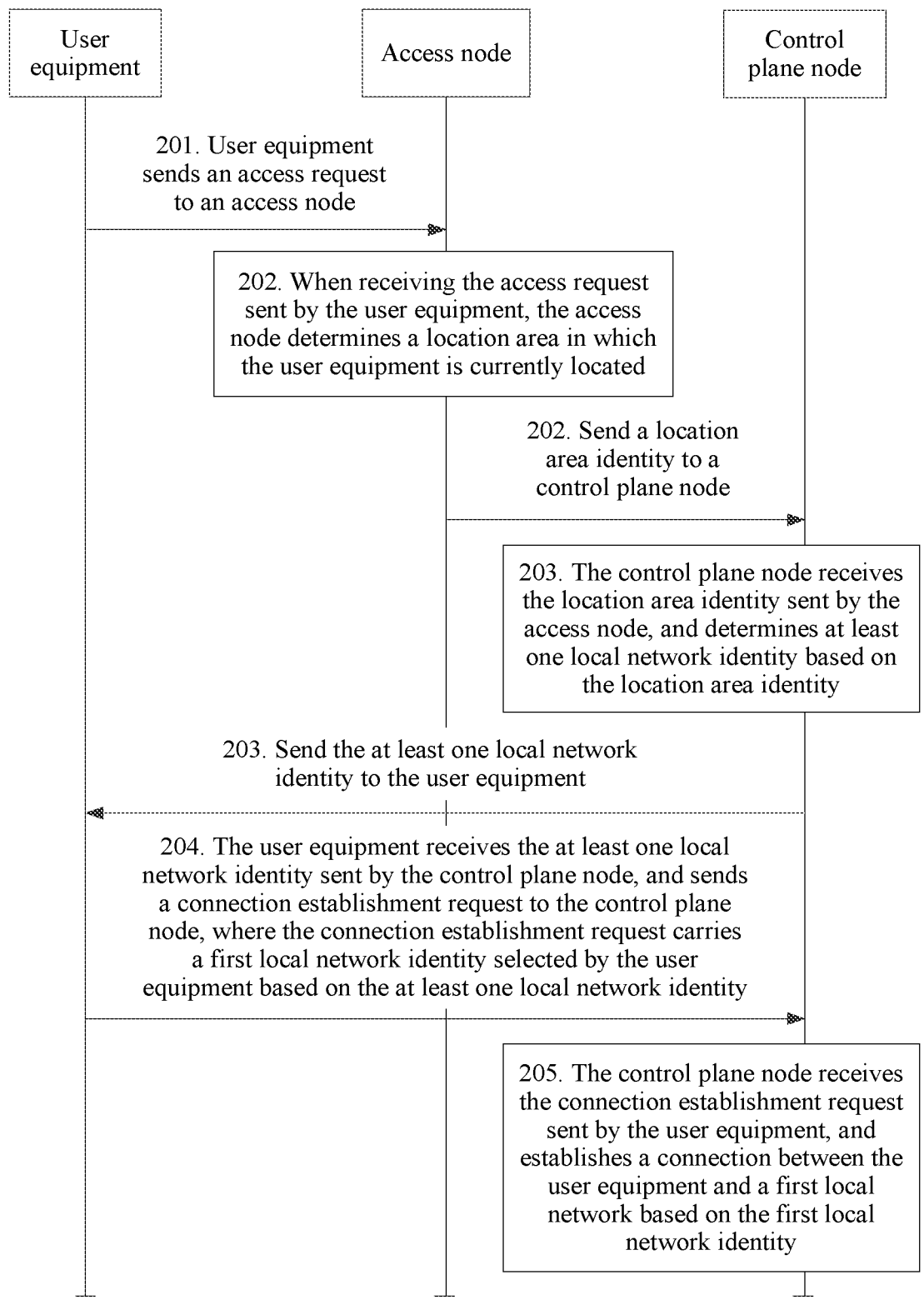
FIG. 2 is a flowchart of a local network connection method according to an embodiment of the present application.
Figure 3A:
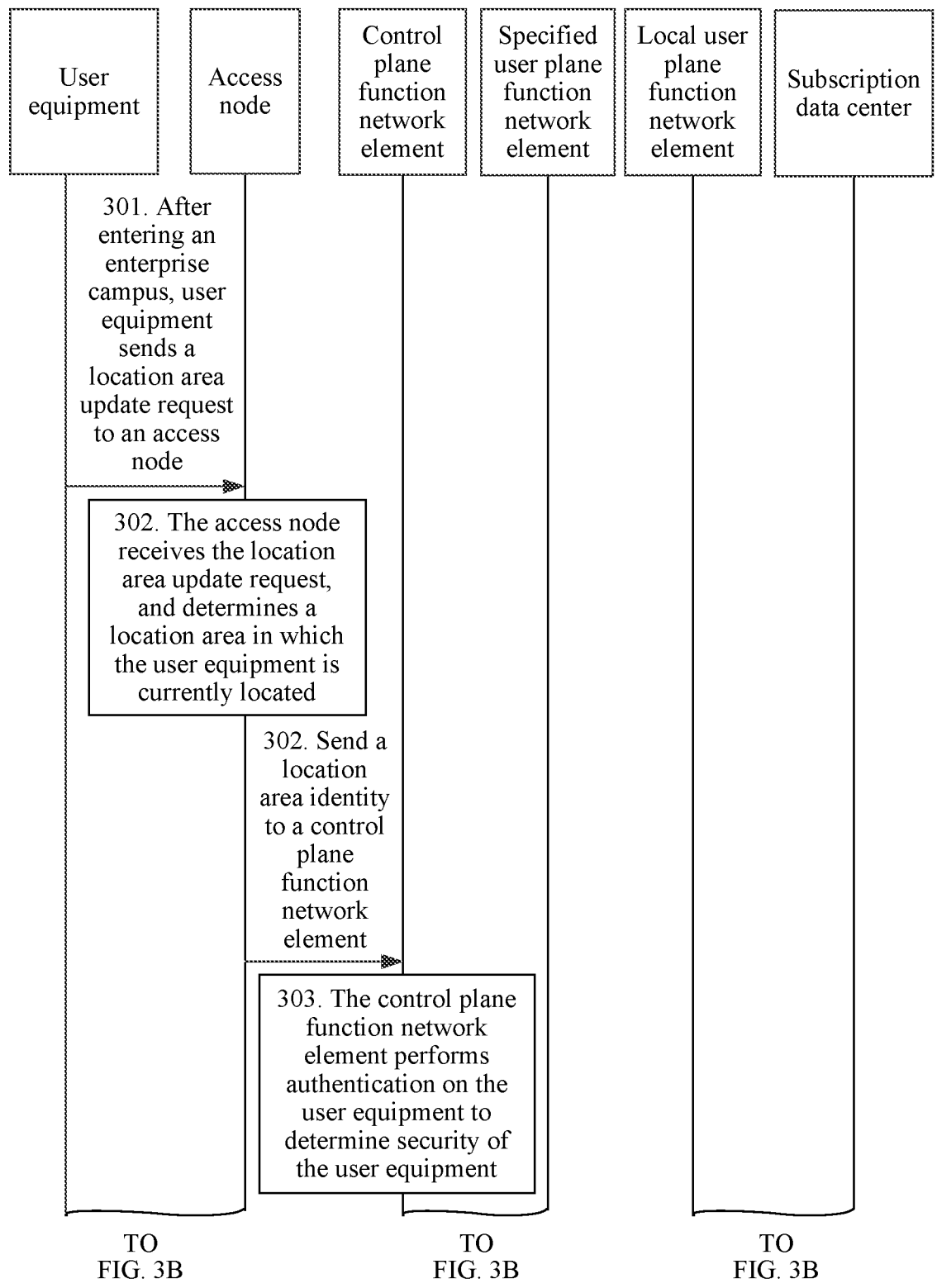
FIG. 3A, FIG. 3B, FIG. 3C, and FIG. 3D are flowcharts of another local network connection method according to an embodiment of the present application.
Figure 3B:
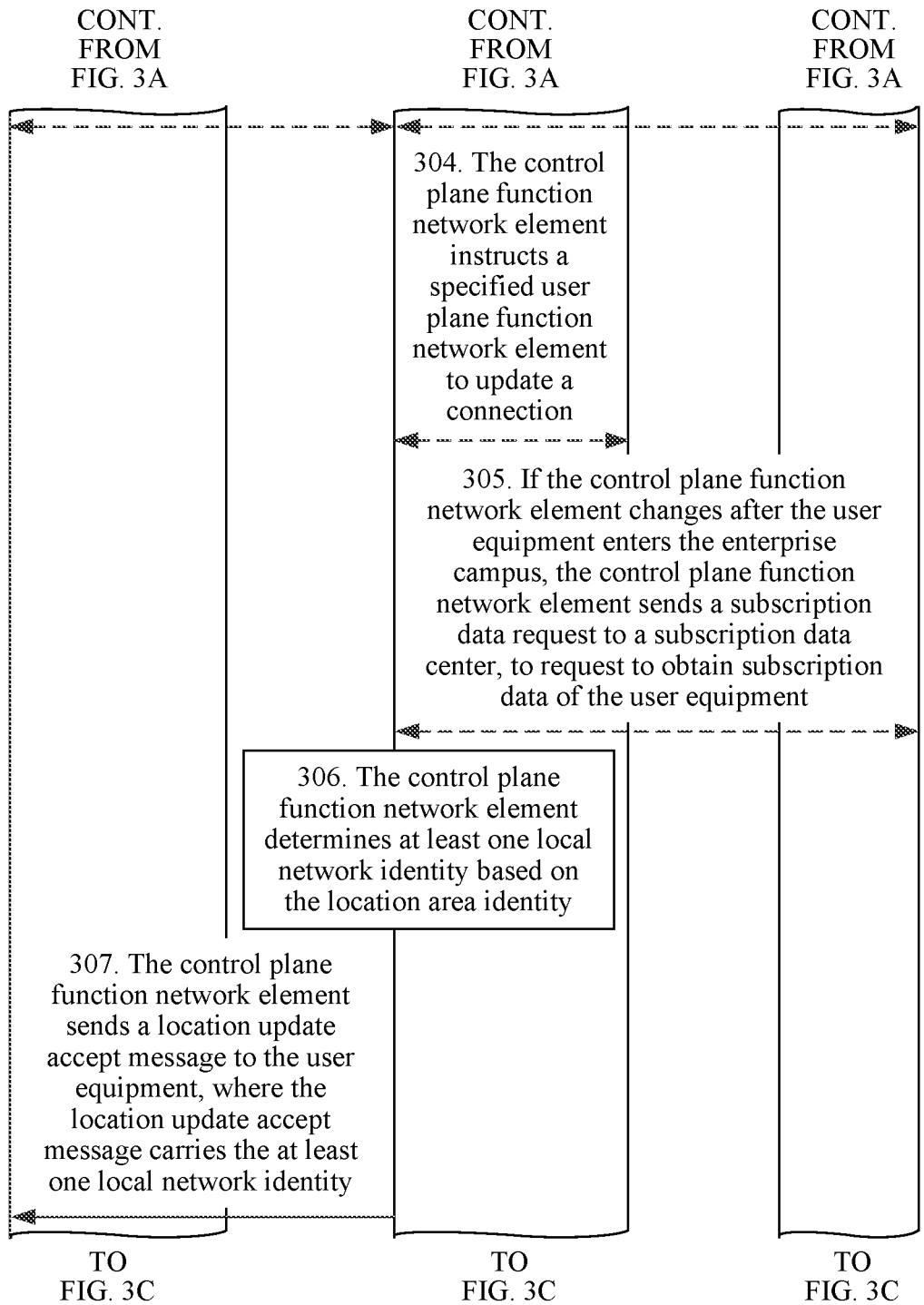
Figure 3C:
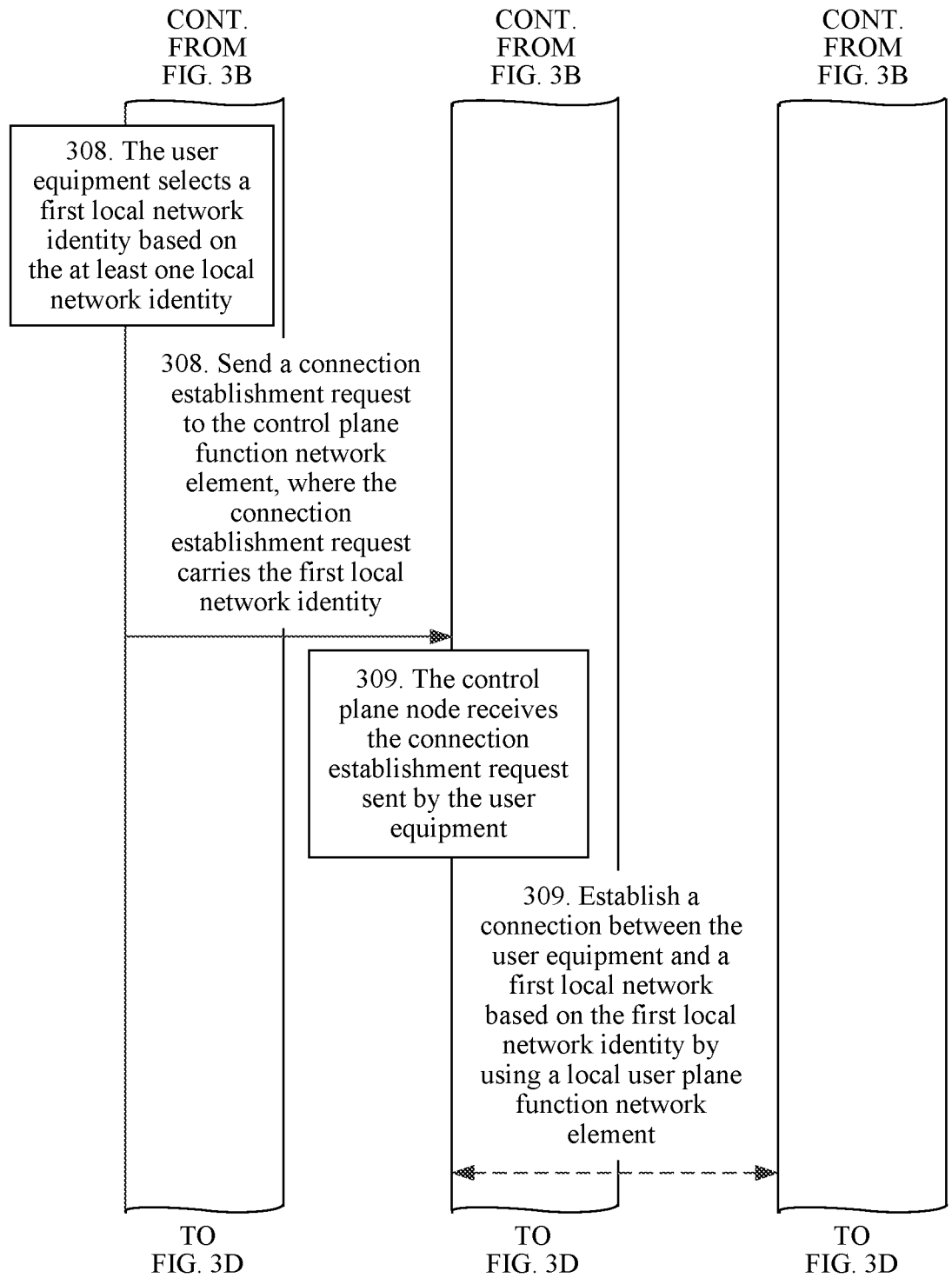
Figure 3D:
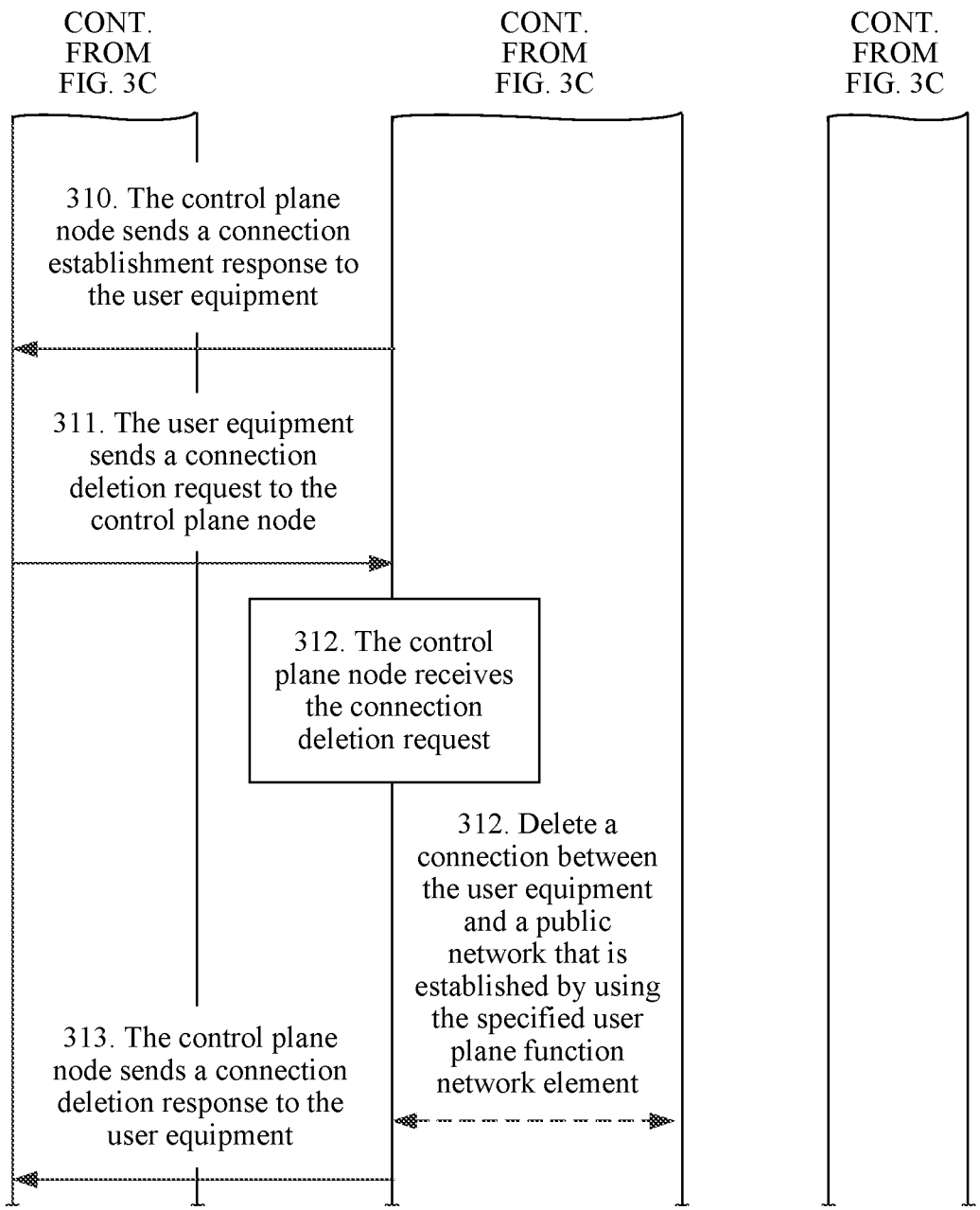

FIG. 2 is a flowchart of a local network connection method according to an embodiment of the present application. Interaction bodies of the method are a user equipment, an access node, and a control plane node. Referring to FIG. 2, the method includes the following steps.

Step 201: The user equipment sends an access request to the access node.

The access node is an access node corresponding to a location area in which the user equipment is currently located. The access request includes a location area update request or an attach request. The location area update request is sent by the user equipment when the location area in which the user equipment is located changes, and the attach request is sent by the user equipment when the equipment is enabled. The access node needs to forward the access request message to the control plane node.

For example, an enterprise campus in which a local network is deployed and an area outside the enterprise campus are different location areas, and when the user equipment moves from the area outside the enterprise campus to the enterprise campus, the location area changes. Therefore, the user equipment is prompted to initiate a location area update process, and sends the location area update request to the access node first in the process.

Step 202: When receiving the access request sent by the user equipment, the access node determines a location area in which the user equipment is currently located, and sends a location area identity to the control plane node.

The location area identity is used to indicate the location area in which the user equipment is currently located.

In this embodiment of the present application, the access node may divide a served geographical range into different location areas, and set a corresponding location area identity for each location area. The location area identity is used to uniquely indicate the location area. For example, the location area identity may be a name, a number, or the like of the location area, and this is not limited in this embodiment of the present application.

When receiving the access request sent by the user equipment, the access node may determine the location area identity of the location area in which the user equipment is currently located, and send the location area identity to the control plane node.

For an EPS network, an eLTE network, and a 2G/3G network, the location area update request sent by the user equipment may be a routing area update request or a tracking area update request. Correspondingly, the location area identity sent by the access node may be a routing area identity (RAI) or a tracking area identity (TAT).

In addition, the access node further forwards the received access request to the control plane node.

Step 203: The control plane node receives the location area identity sent by the access node, determines at least one local network identity based on the location area identity, and sends the at least one local network identity to the user equipment.

The local network identity is used to uniquely indicate a local network, and may be an access point name (APN) corresponding to the local network, a network name of the local network, an enterprise name of the local network, or the like. This is not limited in this embodiment of the present application. In addition, the local network identity may be identified using a combination of a letter, a number, a special character, and the like. For example, the local network identity may be enterprise01, enterprise01.mnc012.mcc345.gprs, enterprise01.mnc034.mcc567.org, or the like.

In this embodiment of the present application, determining at least one local network identity based on the location area identity may include the following several possible implementations.

In a first manner, a local network identity corresponding to the location area identity is obtained from a stored location area list, where the location area list stores a plurality of location area identities and corresponding local network identities. Additionally, the local network identity corresponding to the location area identity is determined as the at least one local network identity.

It should be noted that, in this embodiment of the present application, a plurality of local networks may be planned to be in a same location area, and one control plane node may simultaneously serve a plurality of adjacent location areas. Therefore, each location area may have one or more local networks, corresponding to one or more local network identities, and different location areas may correspond to one or more different local networks. In addition, in this embodiment of the present application, different location area identities and corresponding local network identities may be stored in a location area list in advance. As such, a local network identity corresponding to a location area identity is matched based on the location area list.

The control plane node may obtain the corresponding local network identity from the locally stored location area list. Alternatively, the control plane node may send the location area identity to another network element, and obtain the corresponding local network identity from a location area list stored by the other network element. This is not limited in this embodiment of the present application.

To be more specific, the control plane node may store a location area list in advance, for example, the location area list may be configured in the control plane node in advance using an operation and maintenance (O&M) end. Alternatively, the control plane node obtains a location area list from another network element, and stores the location area list in the control plane node. Certainly, the control plane node may not store a location area list. When receiving the location area identity, the control plane node may send the location area identity to another function network element, in which case the other function network element obtains the corresponding local network identity from a location area list, and returns the corresponding local network identity to the control plane node.

The other function network element may be a subscription data center, a home subscriber server, a policy function network element, or the like, and this is not limited in this embodiment of the present application.

In a second manner, after a local network identity corresponding to the location area identity is obtained from a stored location area list, the at least one local network identity is determined with reference to at least one of local network access indication information of the user equipment, local network subscription information, or an operator policy.

The following several possible implementations may be included.

1. The at least one local network identity is determined with reference to the location area list and the local network access indication information of the user equipment.

For example, the control plane node may be configured to: obtain, from the stored location area list, the local network identity corresponding to the location area identity; receive the access request sent by the user equipment using the access node, where the access request carries the local network access indication information, and the local network access indication information is used to indicate whether the user equipment is allowed to access a local network; and when the local network access indication information indicates that the user equipment is allowed to access the local network, determine the local network identity corresponding to the location area identity as the at least one local network identity.

In addition, when the local network access indication information indicates that the user equipment is not allowed to access the local network, the control plane node may no longer determine the local network identity, nor send any local network identity to the user equipment.

The local network access indication information carried in the access request may include the following several forms.

(1) The access request may carry one type of indication information used to indicate that the user equipment is not allowed to access the local network. For example, if the access request carries the indication information, it indicates that the user equipment is not allowed to access the local network. Alternatively, if the access request does not carry the indication information, it indicates that the user equipment is allowed to access the local network.

(2) The access request may carry one type of indication information used to indicate that the user equipment is allowed to access the local network. For example, if the access request carries the indication information, it indicates that the user equipment is allowed to access the local network. Alternatively, if the access request does not carry the indication information, it indicates that the user equipment is not allowed to access the local network.

(3) The access request may carry two types of indication information, where first indication information is used to indicate that the user equipment is allowed to access the local network, and second indication information is used to indicate that the user equipment is not allowed to access the local network. For example, if the access request carries the first indication information, it indicates that the user equipment is allowed to access the local network. Alternatively, if the access request carries the second indication information, it indicates that the user equipment is not allowed to access the local network.

It should be noted that the local network access indication information of the user equipment may indicate willingness of a user. In application, a consent option and/or a reject option may be set in the user equipment, and such option is used to indicate whether the user consents to access to the local network by the used user equipment. When a trigger operation for the consent option is detected, the access request may carry the local network access indication information indicating that the user equipment is allowed to access the local network. When a trigger operation for the reject option is detected, the access request may carry the local network access indication information indicating that the user equipment is not allowed to access the local network.

2. The at least one local network identity is determined with reference to the location area list and the local network subscription information.

In this embodiment of the present application, the control plane node may further manage, with reference to the local network subscription information, a local network that allows the user equipment to access, to extend a management manner for a local network connection, and improve connection accuracy and connection efficiency.

The local network subscription information of the user equipment may include local network identity information or network capability indication information. The local network identity information is an identity of the local network that allows the user equipment to access, and the network capability indication information is used to indicate whether the user equipment is allowed to access the local network.

Correspondingly, determining the at least one local network identity with reference to the location area list and the local network subscription information may include the following two implementations.

(1) The local network identity corresponding to the location area identity is obtained from the stored location area list. The local network subscription information of the user equipment is obtained, where the local network subscription information includes the local network identity information, and the local network identity information is the identity of the local network that allows the user equipment to access. Additionally, the at least one local network identity is determined based on the local network identity corresponding to the location area identity and the local network identity information.

An implementation of determining the at least one local network identity based on the local network identity corresponding to the location area identity and the local network identity information includes: determining, from the local network identity corresponding to the location area identity, a local network identity that is the same as the identity, included in the local network identity information, of the local network that allows the user equipment to access; and determining the same local network identity as the at least one local network identity.

In this implementation, the user equipment may subscribe to some local networks in advance, to indicate that a mobile communications network operator allows the user equipment to access the subscribed local networks; and store identities of the subscribed local networks in the local network subscription information as the local network identity information. Subsequently, when the local network identity corresponding to the location area identity is obtained from the location area list, it can be determined which local network identity in the local network identities is an identity of a local network subscribed in advance. Additionally, the identity of the subscribed local network in the local network identities is used as the at least one local network identity to be sent to the user equipment.

(2) The local network identity corresponding to the location area identity is obtained from the stored location area list. The local network subscription information of the user equipment is obtained, where the local network subscription information includes the network capability indication information, and the network capability indication information is used to indicate whether the user equipment is allowed to access the local network. Additionally, when the network capability indication information indicates that the user equipment is allowed to access the local network, the local network identity corresponding to the location area identity is determined as the at least one local network identity.

In addition, when the network capability indication information indicates that the user equipment is not allowed to access the local network, the control plane node may no longer determine the local network identity, nor send any local network identity to the user equipment.

Compared with the first manner (1), in the second manner (2), a user equipment may centrally subscribe to all local networks instead of subscribing to an individual local network. After subscription, the user equipment can have a capability of accessing all the local networks, and the capability may be indicated using the network capability indication information. Therefore, a management manner in the second manner (2) is simpler, such that management loads of the control plane node are reduced, and management efficiency is improved.

It should be noted that the foregoing two types of local network subscription information may be obtained from a data management network element. For example, for a next generation communications network, the data management network element may be a subscription data center. For an EPS network, an eLTE network, and a 2G/3G network, the data management network element may be a home subscriber server (HSS) or a home location register (HLR).

3. The at least one local network identity is determined with reference to the location area list and the operator policy.

In this embodiment of the present application, the control plane node may further manage, with reference to the operator policy of a serving mobile communications network operator, a local network that allows the user equipment to access, to further extend a management manner for a local network connection, and improve connection accuracy and connection efficiency.

The operator policy may also include local determining the at least one local network identity with reference to the location area list and the operator policy may include the following two implementations.

(1) The local network identity corresponding to the location area identity is obtained from the stored location area identity list. The operator policy is obtained, where the operator policy includes the local network identity information, and the local network identity information is an identity of the local network that allows the user equipment to access. Additionally, the at least one local network identity is determined based on the local network identity corresponding to the location area identity and the local network identity information.

An implementation of determining the at least one local network identity based on the local network identity corresponding to the location area identity and the local network identity information includes: determining, from the local network identity corresponding to the location area identity, a local network identity that is the same as the identity, included in the local network identity information, of the local network that allows the user equipment to access; and determining the same local network identity as the at least one local network identity.

(2) The local network identity corresponding to the location area identity is obtained from the stored location area identity list. The operator policy is obtained, where the operator policy includes the network capability indication information, and the network capability indication information is used to indicate whether the user equipment is allowed to access the local network. Additionally, when the network capability indication information indicates that the user equipment is allowed to access the local network, the local network identity corresponding to the location area identity is determined as the at least one local network identity.

In addition, when the network capability indication information indicates that the user equipment is not allowed to access the local network, the control plane node may no longer determine the local network identity, nor send any local network identity to the user equipment.

4. The at least one local network identity is determined by combining any two of the foregoing three manners or combining the foregoing three manners.

For example, when the foregoing three manners are combined, the control plane node may comprehensively determine the at least one local network identity with reference to the location area list, the local network access indication information of the user equipment, the local network subscription information, and the operator policy.

In some embodiments, the control plane node may be configured to: obtain the local network identity corresponding to the location area identity from the location area list; receive the access request sent by the user equipment using the access node, where the access request carries the local network access indication information; obtain the local network subscription information of the user equipment and the operator policy; and comprehensively determine the at least one local network identity based on the local network identity corresponding to the location area identity, the local network access indication information, the local network subscription information, and the operator policy.

For example, when the local network subscription information includes the local network identity information, and the operator policy includes the network capability indication information, when the network access indication information in the access request sent by the user equipment indicates that the user equipment is allowed to access the local network and the network capability indication information in the operator policy indicates that the user equipment is allowed to access the local network, the control plane node can determine, from the local network identity corresponding to the location area identity, a local network identity that is the same as the identity, included in the local network identity information in the local network subscription information, of the local network that allows the user equipment to access, and determine the same local network identity as the at least one local network identity.

When the network access indication information indicates that the user equipment is not allowed to access the local network, or the network capability indication information indicates that the user equipment is not allowed to access the local network, the control plane node may no longer determine the local network identity, nor send any local network identity to the user equipment.

For another example, when the local network subscription information includes the local network identity information and the operator policy also includes the local network identity information, when the network access indication information indicates that the user equipment is allowed to access the local network, the control plane node can determine a same local network identity from the local network identity corresponding to the location area identity, the local network identity included in the local network identity information in the local network subscription information, and the local network identity included in the local network identity information in the operator policy, and determine the same local network identity as the at least one local network identity.

Certainly, after the foregoing three manners are combined, there may be another implementation, and details are not described herein in this embodiment of the present application.

It should be noted that, in application, the network capability indication information in the local network subscription information or the operator policy may have the following several implementations.

(1) The local network subscription information or the operator policy may carry one type of indication information used to indicate that the user equipment is not allowed to access the local network. For example, if the indication information is carried, it indicates that the user equipment is not allowed to access the local network. Alternatively, if the indication information is not carried, it indicates that the user equipment is allowed to access the local network.

(2) The local network subscription information or the operator policy may carry one type of indication information used to indicate that the user equipment is allowed to access the local network. For example, if the local network subscription information or the operator policy carries the indication information, it indicates that the user equipment is allowed to access the local network. Alternatively, if the local network subscription information or the operator policy does not carry the indication information, it indicates that the user equipment is not allowed to access the local network.

(3) The local network subscription information or the operator policy may carry two types of indication information, where first indication information is used to indicate that the user equipment is allowed to access the local network, and second indication information is used to indicate that the user equipment is not allowed to access the local network. For example, if the first indication information is carried, it indicates that the user equipment is allowed to access the local network. If the second indication information is carried, it indicates that the user equipment is not allowed to access the local network.

It should be further noted that step 203 may further include the following steps 2031 to 206.

Step 2031: The control plane node receives the location area identity sent by the access node.

Step 2032: Perform authentication on the user equipment to determine security of the user equipment.

Step 2033: For a user equipment whose location area changes, if the user equipment establishes a network connection using a specified user plane node before the location area changes, notify the specified user plane node to update the connection.

The updated connection is a service channel from the user equipment to a packet data network, and is configured to forward a user plane data packet between the user equipment and an application server in the packet data network.

For example, if the user equipment is connected to a public network using a specified user plane node before entering a local network coverage area of an enterprise campus, connection information, such as a current location area identity of the user equipment and a user plane data packet forwarding address of a new access node, of the user equipment in the specified user plane node can be updated using step 2033.

It should be noted that, for the EPS network, because the user plane node is a system that has two network elements SGW and PGW, the control plane node may need to update connection information only in the SGW. When connection information in the two network elements needs to be updated, the control plane node may interact with the PGW using the SGW. Correspondingly, for the eLTE network, because the user plane node is a system that has two network elements SGW-U and PGW-U, the control plane node may need to update connection information only in the SGW-U. When connection information in the two network elements needs to be updated, the control plane node may interact with the PGW-U using the SGW-U.

Step 2034: For the user equipment whose location area changes, if the corresponding control plane node changes after the location area changes, a changed control plane node sends a subscription data request to a data management network element, to request to obtain subscription data of the user equipment.

After receiving the subscription data request, the data management network element can reply to the control plane node with a response message for the request, where the response message carries the subscription data of the user equipment.

The subscription data of the user equipment may include data such as a tariff and a package of the user equipment. The data management network element is a network element responsible for managing and maintaining home subscriber subscription data. For example, for the next generation communications network, the data management network element may be a subscription data center or the like. For the EPS network, the eLTE network, and the 2G/3G network, the data management network element may be a home subscriber server (HSS), a home location register (HLR), or the like.

The changed control plane node is a control plane node corresponding to a current location area. In addition, the access node also sends the location area identity to the changed control plane node, and the changed control plane node performs related steps.

In addition, for the user equipment whose location area changes, if the corresponding control plane node does not change after the location area changes, the subscription data of the user equipment may be obtained by the control plane node from the subscription data center before the location area of the user equipment changes and when the user equipment accesses the control plane node.

Step 2035: Determine the at least one local network identity based on the location area identity.

Step 2036: Send the at least one local network identity to the user equipment.

It should be noted that the foregoing steps 2032 to 2034 are optional steps, and the control plane node may perform or may not perform the steps. This is not limited in this embodiment of the present application.

In addition, it should be further noted that after receiving the access request of the user equipment, the control plane node may further send an access accept message to the user equipment, for example, a location area update accept message for the location area update request, or an attach accept message for the attach request. In this embodiment of the present application, the control plane node may send the at least one local network identity to the user equipment using the access accept message, or may send the at least one local network identity using another separate message. For example, the at least one local network identity may be sent using an EMM information message that is used by a network side to notify a network name and time zone information in a network similar to the EPS network or using another separately defined message. In addition, when the at least one local network identity is sent using the other separate message, the separate message may be sent to the user equipment in a location area update/attach process, or may be sent to the user equipment after a location area update/attach process ends. This is not limited in this embodiment of the present application.

Step 204: The user equipment receives the at least one local network identity sent by the control plane node, and sends a connection establishment request to the control plane node, where the connection establishment request carries a first local network identity selected by the user equipment based on the at least one local network identity.

When receiving the at least one local network identity sent by the control plane node, the user equipment may display the at least one local network identity, and the user can select a local network that the user wants to access or a local network with relatively high quality based on a requirement of the user and the at least one local network identity displayed by the user equipment. For example, if a user is an employee of an enterprise A, after entering a campus of the enterprise A, the user may select and access a local network of the enterprise A based on at least one displayed local network identity. For another example, if a user drinks coffee in a coffee bar B, the user may select and access a local network of the coffee bar B based on at least one displayed local network identity.

After selecting the local network, the user equipment can initiate the connection establishment request carrying the selected first local network identity, where the connection establishment request is used to request the control plane node to establish a connection between the user equipment and a first local network indicated by the first local network identity.

Step 205: The control plane node receives the connection establishment request sent by the user equipment, and establishes a connection between the user equipment and a first local network based on the first local network identity.

For example, the control plane node may determine, based on the first local network identity, a local user plane node corresponding to the first local network identity, and send a connection notification to the local user plane node, to instruct the local user plane node to establish the connection between the user equipment and the first local network, to be more specific, to enable the user equipment to access the first local network.

For different first local network identities, processes of determining local user plane nodes corresponding to the first local network identities are different, and may include but are not limited to the following several manners.

(1) If the first local network identity is an access point name corresponding to the first local network, the local user plane node is determined based on the access point name.

(2) If the first local network identity is an enterprise name or a network name of the first local network, a corresponding access point name is first determined based on a correspondence between a local network identity and an access point name, and the local user plane node is then determined based on the access point name.

The correspondence between a local network identity and an access point name may be configured in a control plane function network element in advance using an operation and maintenance end. Alternatively, the correspondence may be obtained from another network element such as the subscription data center, the home subscriber server, or the policy function network element. This is not limited in this embodiment of the present application.

There are a plurality of methods for determining the local user plane node based on the access point name. For example, a local user plane node address corresponding to the access point name is inquired of another network element such as a domain name system (DNS). For another example, a local user plane node address corresponding to the access point name is determined based on a local configuration in a control plane function node.

Further, before establishing the connection between the user equipment and the first local network based on the first local network identity, the control plane node may first determine whether the at least one local network identity includes the first local network identity. When the at least one local network identity includes the first local network identity, the control plane node may perform the step of establishing the connection between the user equipment and the first local network based on the first local network identity. In addition, when the at least one local network identity does not include the first local network identity, the control plane node does not perform the step of establishing the connection between the user equipment and the first local network based on the first local network identity.

To be more specific, after receiving the first local network identity sent by the user equipment, the control plane node may first check the first local network identity, to check whether the first local network identity belongs to the at least one local network identity sent by the control plane node to the user equipment. If the first local network identity belongs to the at least one local network identity, the connection between the user equipment and the first local network is established. If the first local network identity does not belong to the at least one local network identity, the connection between the user equipment and the first local network is not established. Through checking, connection accuracy is improved, and a connected first local network avoids being a local network that may not be in the location area or a local network that does not allow access.

Further, after establishing the connection between the user equipment and the first local network, the control plane node may further reply to the user equipment with a connection establishment response.

Further, for the user equipment whose location area changes, if the user equipment establishes a network connection using a specified user plane node before the location area changes, after the connection to the first local network is successfully established, the network connection established by the user equipment using the specified user plane node may be further released.

The step of releasing the connection may be triggered by the user equipment, or may be triggered by the control plane node, and this is not limited in this embodiment of the present application. For example, after the connection to the first local network is successfully established, the user equipment may send a connection deletion request to the control plane node, to request the control plane node to delete the network connection established using the specified user plane node. Alternatively, after sending the connection establishment response to the user equipment, the control plane node instructs the specified user plane node and the user equipment to delete the previously established network connection.

In this embodiment of the present application, when the user equipment enters a location area and sends an access request to the access node, the access node may send, to the control plane node, a location area identity indicating the location area in which the user equipment is currently located. The control plane node may determine at least one local network identity based on the location area identity, and send the at least one local network identity to the user equipment for selection by the user equipment. Therefore, the user may autonomously select, using the user equipment, a local network that needs to be accessed. To be more specific, the user may autonomously select a local network that the user wants to access or a local network with relatively high quality, such that a local network connection effect and flexibility are improved, and a local network connection mode is extended. In addition, the mobile communications network operator does not need to plan a specific location area identity for each local network or deploy a dedicated control plane node, a plurality of local networks may be planned to be in a same location area, and the control plane node may simultaneously serve a plurality of adjacent location areas, such that deployment costs are reduced.

To make the technical solutions of the present application clearer, the following further describes the technical solutions of the present application in detail using a next generation mobile communications network as an example.

It can be learned from the description in the foregoing implementation environment that when the mobile communications network is the next generation mobile communications network, the foregoing control plane node is a control plane function network element, the foregoing user plane node is a user plane function network element, and the foregoing data management network element may be a subscription data center.

FIG. 3A, FIG. 3B, FIG. 3C, and FIG. 3D are flowcharts of a local network connection method according to an embodiment of the present application. Interaction bodies of the method are a user equipment, an access node, a control plane function network element, a user plane function network element, and a subscription data center. If the user equipment establishes a connection to a public network using a specified user plane function network element before entering an enterprise campus, and a location area changes after the user equipment enters the enterprise campus, referring to FIG. 3A, FIG. 3B, FIG. 3C, and FIG. 3D, a process in which the user equipment is connected to a local network in the location area using the next generation mobile communications network may include the following steps.

Step 301: After entering the enterprise campus, the user equipment sends a location area update request to the access node.

Step 302: The access node receives the location area update request, determines a location area in which the user equipment is currently located, and sends a location area identity to the control plane function network element.

Step 303: The control plane function network element performs authentication on the user equipment to determine security of the user equipment.

Step 304: The control plane function network element instructs the specified user plane function network element to update the connection.

Step 305: If the control plane function network element changes after the user equipment enters the enterprise campus, the control plane function network element sends a subscription data request to the subscription data center, to request to obtain subscription data of the user equipment.

Step 306: The control plane function network element determines at least one local network identity based on the location area identity.

Step 307: The control plane function network element sends a location update accept message to the user equipment, where the location update accept message carries the at least one local network identity.

Step 308: The user equipment selects a first local network identity based on the at least one local network identity, and sends a connection establishment request to the control plane function network element, where the connection establishment request carries the first local network identity.

Step 309: The control plane function network element receives the connection establishment request sent by the user equipment, and establishes a connection between the user equipment and a first local network based on the first local network identity using a local user plane function network element.

Step 310: The control plane function network element sends a connection establishment response to the user equipment.

Step 311: The user equipment sends a connection deletion request to the control plane function network element, to request to delete the connection to the public network that is established using the specified user plane function network element.

Step 312: The control plane function network element receives the connection deletion request, and deletes the connection between the user equipment and the public network that is established using the specified user plane function network element.

Step 313: The control plane function network element sends a connection deletion response to the user equipment.

Further, if the control plane function network element in the next generation mobile communications network is further split into independent network functions such as a session management function and a mobility management function, a function of the control plane function network element may be completed through cooperation of the session management function and the mobility management function, and this is as follows.

Step 302: The access node receives the location area update request, determines a location area in which the user equipment is currently located, and sends a location area identity to the mobility management function. The mobility management function notifies the session management function of the location area identity.

Step 304: The session management function instructs the specified user plane function network element to update the connection.

Step 305: If the mobility management function changes after the user equipment enters the enterprise campus, the mobility management function sends a subscription data request to the subscription data center, to request to obtain subscription data of the user equipment.

Step 306: The session management function determines at least one local network identity based on the location area identity.

Step 307: The session management function notifies the user equipment of the at least one local network identity. Additionally, the session management function may send a location update accept message to the user equipment using the mobility management function, where the location update accept message carries the at least one local network identity.

Step 308: The user equipment selects a first local network identity based on the at least one local network identity, and sends a connection establishment request to the session management function. The connection establishment request carries the first local network identity, and the connection establishment request is forwarded to the session management function by the mobility management function.

Step 309: The session management function receives the connection establishment request sent by the user equipment. Additionally, the session management function establishes a connection between the user equipment and a first local network based on the first local network identity using a local user plane function network element.

Step 310: The session management function sends a connection establishment response to the user equipment.

Step 311: The user equipment sends a connection deletion request to the session management function, to request to delete the connection to the public network that is established using the specified user plane function network element.

Step 312: The session management function receives the connection deletion request, and deletes the connection between the user equipment and the public network that is established using the specified user plane function network element.

Step 313: The session management function sends a connection deletion response to the user equipment.

It should be noted that, in this embodiment of the present application, the foregoing process in which the user equipment is connected to the local network in the next generation mobile communications network is only used as an example for description. In application, another implementation may be used referring to the method embodiment in FIG. 2. For an implementation process, refer to the method embodiment in FIG. 2. Details are not described herein. In addition, for an implementation process of an EPS network, an eLTE network, and a 2G/3G network, refer to the method embodiment in FIG. 2. Details are not described herein.

Figure 4A:
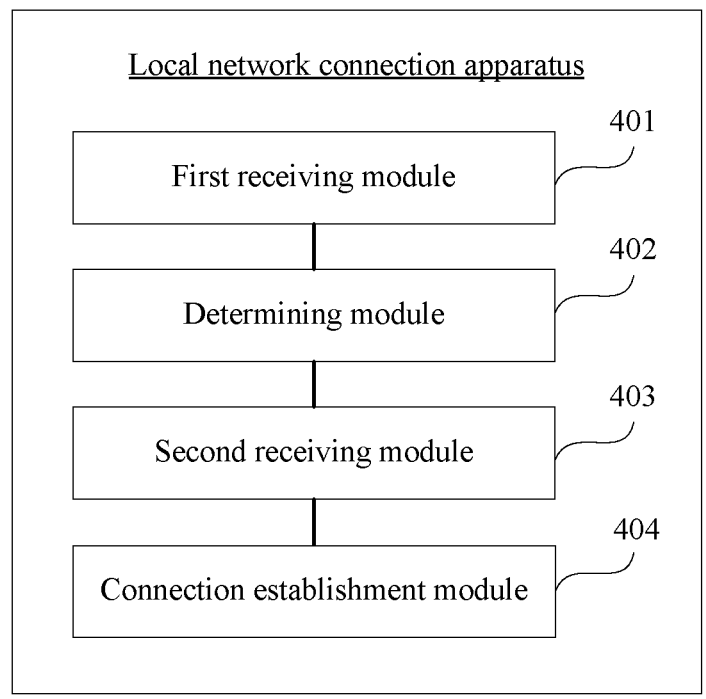
FIG. 4A is a block diagram of a local network connection apparatus according to an embodiment of the present application.

FIG. 4A is a block diagram of a local network connection apparatus according to an embodiment of the present application. The apparatus may be the control plane node described in the embodiment in FIG. 2 or the control plane function network element described in the embodiment in FIG. 3A, FIG. 3B, FIG. 3C, and FIG. 3D. Referring to FIG. 4A, the apparatus includes a first receiving module 401, a determining module 402, a second receiving module 403, and a connection establishment module 404.

The first receiving module 401 and the determining module 402 are configured to perform step 203 in the foregoing embodiment, and the second receiving module 403 and the connection establishment module 404 are configured to perform step 205 in the foregoing embodiment.

Figure 4B:
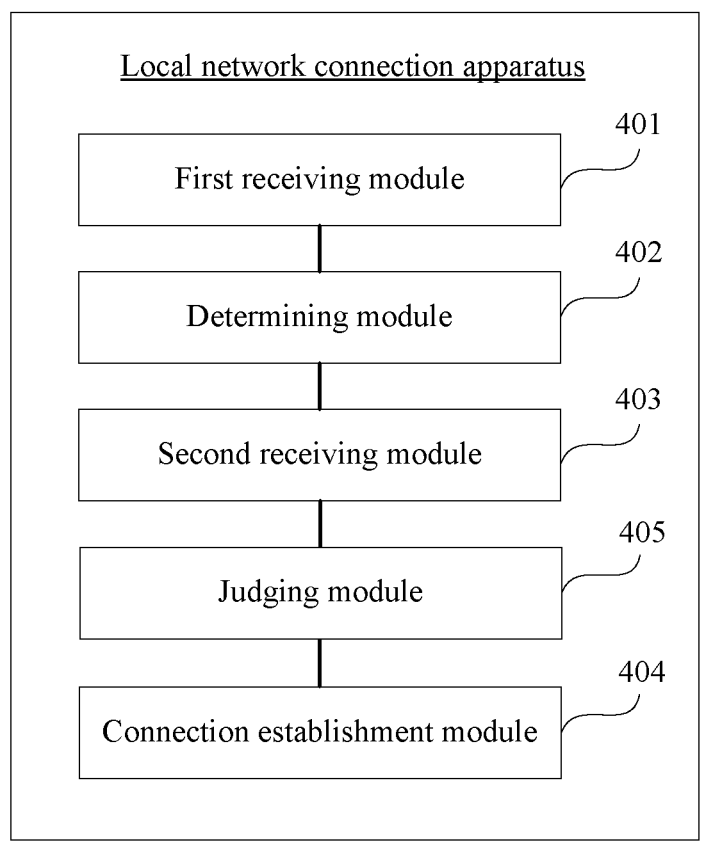
FIG. 4B is a block diagram of another local network connection apparatus according to an embodiment of the present application.

Optionally, referring to FIG. 4B, the apparatus further includes a judging module 405 configured to determine whether at least one local network identity determined by the determining module 402 includes a first local network identity received by the second receiving module 403.

The connection establishment module 404 is further configured such that when the at least one local network identity determined by the determining module 402 includes the first local network identity received by the second receiving module 403, the connection establishment module 404 establishes a connection between a user equipment and a first local network based on the first local network identity.

In this embodiment of the present application, when the user equipment enters a location area, the local network connection apparatus may send at least one local network identity in the location area to the user equipment. Therefore, a user may autonomously select, using the user equipment, a local network that needs to be accessed. To be more specific, the user may autonomously select a local network that the user wants to access or a local network with relatively high quality, such that a local network connection effect and flexibility are improved, and a local network connection mode is extended. In addition, a mobile communications network operator does not need to plan a specific location area identity for each local network or deploy a dedicated control plane node, as a plurality of local networks may be planned to be in a same location area, and the control plane node may simultaneously serve a plurality of adjacent location areas, such that deployment costs are reduced.

The first receiving module 401 and the second receiving module 403 may be a receiver, and the first receiving module 401 and the second receiving module 403 may be integrated into one transceiver module, which is implemented as a transceiver corresponding to hardware. The determining module 402, the connection establishment module 404, the judging module 405, and the like may be built in or independent of a processor of the local network connection apparatus in a hardware form, or may be stored in a memory of the local network connection apparatus in a software form, such that the processor invokes and performs operations corresponding to the foregoing modules. The processor may be a central processing unit (CPU), a microprocessor, a single-chip microcomputer, or the like.

It should be noted that, when the local network connection apparatus provided in the foregoing embodiment implements the local network connection method, division of the foregoing function modules is only used as an example for description. In application, the functions may be allocated to different function modules for implementation based on a requirement. To be more specific, an internal structure of a device is divided into different function modules to complete all or some functions described above. In addition, the local network connection apparatus provided in the foregoing embodiment pertains to a same concept as the local network connection method embodiments. For an implementation process of the local network connection apparatus, refer to the method embodiments. Details are not described herein.

The sequence numbers of the foregoing embodiments of the present application are only for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are only example embodiments of the present application, but are not intended to limit the present application. Any modification, equivalent replacement, and improvement made without departing from the spirit and principle of the present application shall fall within the protection scope of the present application.

What is claimed is:

1. A local network connection system comprising:
   an access node configured to send a location area identity, the location area identity indicating a location area in which a user equipment is located; and
   a control plane node configured to:
   receive the location area identity from the access node;
   determine at least one local network identity based on the location area identity and local network subscription information of the user equipment, the local network subscription information indicating a subscribed local network of the user equipment;
   send the at least one local network identity to the user equipment, the at least one local network identity indicating one or more local networks for the user equipment; and
   receive a connection establishment request from the user equipment, the connection establishment request comprising a first local network identity within the at least one local network identity.

2. The local network connection system according to claim 1, wherein the control plane node is further configured to establish a connection between the user equipment and a first local network based on the first local network identity.

3. The local network connection system according to claim 2, wherein the control plane node is further configured to determine that the at least one local network identity comprises the first local network identity.

4. The local network connection system according to claim 1, wherein the control plane node is further configured to determine the at least one local network identity based on an access request received from the user equipment via the access node, and wherein the access request is a location area update request.

5. The local network connection system according to claim 1, wherein the control plane node is further configured to determine the at least one local network identity based on an access request received from the user equipment via the access node, and wherein the access request is an attach request.

6. The local network connection system according to claim 1, wherein the local network identity is an access point name corresponding to one of:
   a local network,
   a network name of the local network, or
   an enterprise name of the local network.

7. A local network connection method, comprising:
   sending, by a user equipment in a location area, an access request;
   receiving, by the user equipment, from a control plane node in response to the access request, at least one local network identity corresponding to the location area, the at least one local network identity indicating one or more local networks for the user equipment, wherein the one or more local networks are subscribed local networks of the user equipment; and
   sending, by the user equipment, a connection establishment request to the control plane node, the connection establishment request comprising a first local network identity within the at least one local network identity.

8. The local network connection method according to claim 7, wherein the access request comprises local network access indication information, and wherein the local network access indication information indicates a willingness of accessing a local network.

9. The local network connection method according to claim 7, wherein the at least one local network identity is an access point name corresponding to one of:
   a local network,
   a network name of the local network, or
   an enterprise name of the local network.

10. A user equipment comprising:
    at least one processor; and
    a computer readable storage medium storing programming for execution by the at least one processor such that when executed, cause the user equipment to:
    send an access request;

receive, from a control plane node in response to the access request, at least one local network identity corresponding to a location area in which the user equipment is located, the at least one local network identity indicating one or more local networks for the user equipment, wherein the one or more local networks are subscribed local networks of the user equipment; and send a connection establishment request to the control plane node, the connection establishment request comprising a first local network identity within the at least one local network identity.

11. The user equipment according to claim 10, wherein the access request comprises local network access indication information, and wherein the local network access indication information indicates a willingness of accessing a local network.

12. The user equipment according to claim 10, wherein the at least one local network identity is an access point name corresponding to one of:
    a local network,
    a network name of the local network, or
    an enterprise name of the local network.

13. A non-transitory computer-readable medium storing computer instructions that when executed by one or more processors, cause the one or more processors to implement a method comprising:
    sending an access request;
    receiving, from a control plane node in response to the access request, at least one local network identity corresponding to a location area in which a user equipment is located, the at least one local network identity indicating one or more local networks for the user equipment, wherein the one or more local networks include a local network for selection by the user equipment, and wherein the local network is a subscribed local network of the user equipment; and
    sending a connection establishment request to the control plane node, the connection establishment request comprising a first local network identity within the at least one local network identity.

14. The non-transitory computer-readable medium according to claim 13, wherein the access request comprises local network access indication information, and wherein the local network access indication information indicates a willingness of accessing the local network.

15. The non-transitory computer-readable medium according to claim 13, wherein the at least one local network identity is an access point name corresponding to the local network.

16. The non-transitory computer-readable medium according to claim 13, wherein the at least one local network identity is an access point name corresponding to a network name of the local network.

17. The non-transitory computer-readable medium according to claim 13, wherein the at least one local network identity is an access point name corresponding to an enterprise name of the local network.

18. A local network connection method, comprising:
    sending, by an access node, a location area identity to a control plane node, the location area identity indicating a location area in which a user equipment is located; and
    receiving, by the control plane node, the location area identity from the access node;
    determining, by the control plane node, at least one local network identity based on the location area identity and local network subscription information of the user equipment, the local network subscription information indicating a subscribed local network of the user equipment;
    sending, by the control plane node, the at least one local network identity to the user equipment, the at least one local network identity indicating one or more local networks for the user equipment; and
    receiving, by the control plane node, a connection establishment request from the user equipment, the connection establishment request comprising a first local network identity within the at least one local network identity.

19. The local network connection method according to claim 18, further comprising establishing, by the control plane node, a connection between the user equipment and a first local network based on the first local network identity.

20. The local network connection method according to claim 18, wherein the first local network identity is an access point name corresponding to one of:
    a local network,
    a network name of the local network, or
    an enterprise name of the local network.

* * * * *

UNITED STATES PATENT AND TRADEMARK OFFICE
CERTIFICATE OF CORRECTION

PATENT NO.         : 11,304,121 B2
APPLICATION NO.    : 16/922698
DATED              : April 12, 2022
INVENTOR(S)        : Yin Page 1 of 1

It is certified that error appears in the above-identified patent and that said Letters Patent is hereby corrected as shown below:

In the Claims

Column 23, Line 59-61, Claim 1 should read:
A local network connection system comprising:
    an access node configured to send a location area identity indicating a location area in which a user equipment is located;

Signed and Sealed this
Seventh Day of June, 2022

Katherine Kelly Vidal
*Director of the United States Patent and Trademark Office*